United States Patent [19]

Hansen et al.

[11] Patent Number: 5,308,282
[45] Date of Patent: May 3, 1994

[54] PRESSURE PLATE FOR A VIBRATION DAMPER ASSEMBLY HAVING BUILT IN LASH

[75] Inventors: James E. Hansen, Northville; Christopher G. Garbacz, Livonia, both of Mich.

[73] Assignee: Ford Motor Company, Dearborn, Mich.

[21] Appl. No.: 913,338

[22] Filed: Jul. 15, 1992

[51] Int. Cl.5 .......................... F16D 3/12; F16D 3/14; F16D 13/68

[52] U.S. Cl. ...................... 464/68; 464/180; 464/66; 192/70.17; 192/106.1

[58] Field of Search ............... 464/66, 67, 68, 180; 192/70.17, 106.1, 106.2

[56] References Cited

U.S. PATENT DOCUMENTS

| | | | |
|---|---|---|---|
| 4,188,806 | 2/1980 | Fall et al. | 64/27 |
| 4,257,510 | 3/1981 | Fisher | 192/106.1 |
| 4,304,107 | 12/1981 | Fall et al. | 64/27 |
| 4,422,535 | 12/1983 | Ling | 192/3.28 |
| 4,468,207 | 8/1984 | Yoshida | 464/180 X |
| 4,702,721 | 10/1987 | Lamarche | 464/66 X |
| 4,944,374 | 7/1990 | Casse et al. | 192/3.29 |
| 4,976,656 | 12/1990 | Bacher et al. | 464/68 |
| 5,030,166 | 7/1991 | Wörner et al. | 464/68 X |
| 5,073,143 | 12/1991 | Friedmann et al. | 464/68 |
| 5,194,046 | 3/1993 | Jäckel | 464/68 X |

Primary Examiner—Clifford D. Crowder
Assistant Examiner—John L. Calvert
Attorney, Agent, or Firm—Roger L. May; Frank G. McKenzie

[57] ABSTRACT

A vibration damper having a rotary input member connectable to the output of an engine and a driven member connectable to the input of a transmission. The vibration damper has a plurality of springs resiliently connecting the rotary input member to the driven member. A first pressure plate is disposed between the rotary input member and the driven member and a second pressure plate is disposed between the driven member and a retainer plate. A spring produces a lateral force urging the first and second pressure plate into frictional engagement with the rotary input member and the driven member. The first and second pressure plates have elongated circumferential slots which receive drive pins attached to the rotary input member and permit the rotary input member to torsionally vibrate relative to the driven member through a predetermined angle with a low frictional lag permitting the springs to absorb a substantial portion of the low amplitude torsional vibrations.

15 Claims, 2 Drawing Sheets

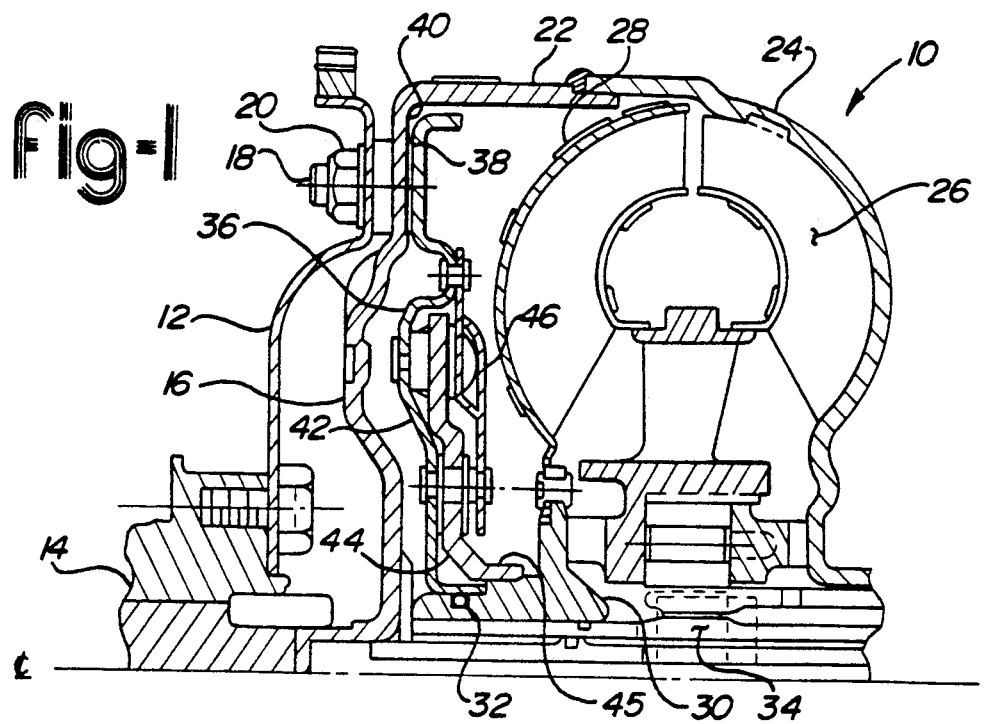

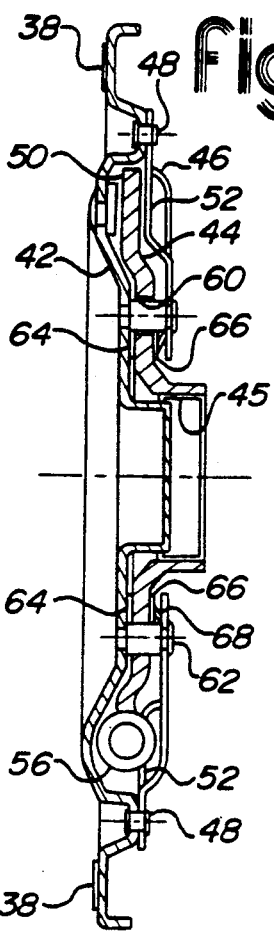
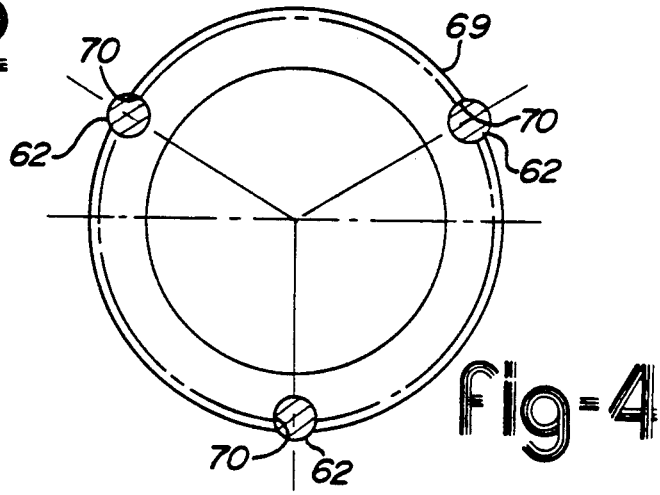
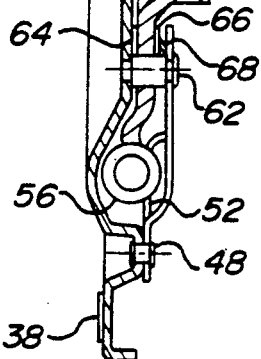
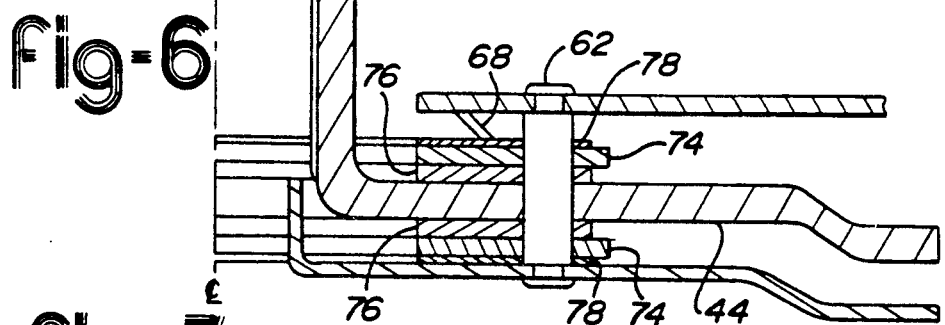
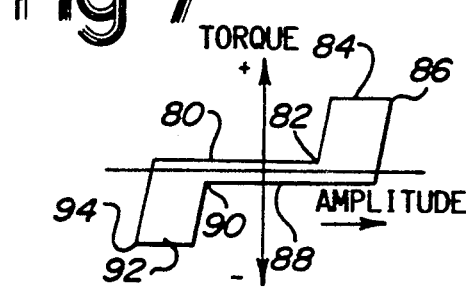
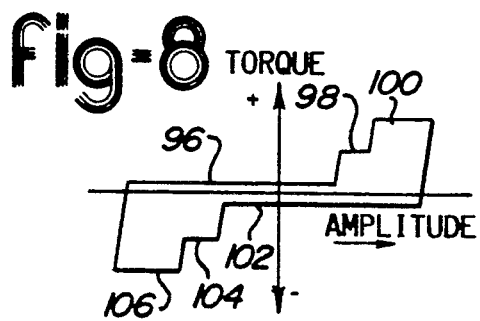

_5,308,282_

PRESSURE PLATE FOR A VIBRATION DAMPER ASSEMBLY HAVING BUILT IN LASH

TECHNICAL FIELD

The invention is related to torsional vibration dampers, and in particular to vibration dampers disposed between the output of an engine and the input to a transmission of an automotive vehicle.

BACKGROUND ART

The rotary output of an internal combustion engine has superimposed torsional vibrations caused by the forces produced by the firing of its individual cylinders. The frequency and amplitude of these torsional vibrations are a function of the number of cylinders the engine has and the engine speed. As is known in the art, the amplitude of the torsional vibrations of a four cylinder engine are greater than the amplitudes of the torsional vibrations produced by a six or eight cylinder engine. In a like manner, the amplitude of the torsional vibrations at low engine speeds are greater than the amplitude of the torsional vibrations at high engine speeds.

In automotive vehicles having manual transmissions, a torsional vibration damper is conveniently incorporated into the clutch assembly to absorb or neutralize these torsional vibrations. In vehicles having automatic transmissions, fluid couplings or torque converters have been used to effectively absorb these torsional vibrations and vibration dampers were unnecessary. However, to increase fuel economy, a lock-up clutch is currently being used on many vehicles which under predetermined operating conditions of the vehicle, lock and provide a direct coupling between the output of the engine and the input to the transmission. When the lock-up clutch is engaged, the torsional vibrations of the engine's output are directly coupled to the transmission.

To eliminate this problem, Ling in U.S. Pat. No. 4,422,535 discloses a damper assembly for an automatic transmission in which the driven member is resiliently connected to the driving member by a plurality of springs arranged circumferentially to absorb the torsional vibrations. Friction members disposed in opposite sides of the driven member provide a degree of frictional damping of driven member to dissipate undesirable resonant vibration energy between the engine and the transmission.

The problem with this type of damper is that the friction between the driving member and the driven member is a constant and is selected to produce a frictional lag to dissipate energy stored in the springs during high amplitude torsional vibrations. Unfortunately, this higher frictional lag also couples a portion of the torsional vibrations to the transmission decreasing the efficiency of the drive train and resulting in an undesirable and often perceptible torsional vibration of the transmission and drive train.

The invention is a vibration damper assembly which introduces a lash into the friction between the rotary input member and the driven member and provides a low friction controlled lag for small torsional vibrations and a high friction controlled lag for torsional vibrations having amplitudes which exceed predetermined limits.

SUMMARY OF THE INVENTION

The invention is a vibration damper assembly which has a low friction lag for small amplitude torsional vibrations to take up angular lash without transmitting perceptible vibration. The friction drag of the vibration damper assembly increases with an increase in the amplitude of the torsional vibrations to dissipate recoil energy stored in the springs. The advantage of the vibration damper is that small amplitude torsional vibrations are absorbed primarily by the springs coupling the rotary input member to the driven member increasing the efficiency of the damper.

The vibration damper has a rotary input member coupled to the rotary output of an engine and a driven member coupled to an output member of a torque converter. The driven member is disposed between the rotary input member and a retainer plate attached to the rotary input member. Three equally spaced drive pins are attached between the rotary input member and the retainer plate. A first pressure plate is disposed between the rotary input member and the driven member. The first pressure plate has a first layer of friction material engaging said rotary input member and a second layer of friction material engaging said driven member. The first pressure plate has three arcuate slots, each arcuate slot receiving a respective one of the three drive pins. The width of the slots being selected to permit the first pressure plate to rotate relative to the rotary input member through a first angle. A second pressure plate is disposed adjacent to the driven member on the side opposite the first pressure plate. The second pressure plate having a first layer of friction material on the input side and a second layer of friction material on the opposite side engageable with the driven member. The second pressure plate has three arcuate slots, each arcuate slot receiving a respective one of the three drive pins. The circumferential width of the arcuate slots in the second pressure plate permitting the second pressure plate to rotate relative to the rotary input member through a second angle.

A bevel spring disposed between the retainer plate and the second pressure plate produces a force biasing the first pressure plate into frictional engagement with the rotary input member, the driven member into frictional engagement with the first pressure plate, and the second pressure plate into frictional engagement with the driven member.

A plurality of circumferentially disposed helical springs resiliently connect the rotary input member to a driven member which resiliently absorb the torsional vibrations received by the rotary input member.

The first layers of friction material have a low coefficient of friction while the second layers of friction material which engage the driven member have a substantially higher coefficient of friction so that the first and second pressure plates will preferentially rotate with the driven member. The circumferential widths of the arcuate slots are selected so at low amplitude torsional vibrations, the first and second pressure plate will remain fixed relative to the driven member and the frictional lag will result only from the friction between the rotary input member and the first layer of friction material on the first pressure plate. The widths of arcuate slots on the first and second pressure plates are different and are selected such that the drive pins engage the end of the arcuate slots of the first pressure plate at an angle different from the angle at which the drive pins engage the ends of the arcuate slots of the second pressure plate causing the friction between the driven member and the first and second pressure plates to increase in two discrete steps.

Other features and advantages of the vibration damper will become more apparent from a reading of the detailed description of the invention in conjunction with the drawings.

BRIEF DESCRIPTION OF THE DRAWINGS

FIG. 1 is a cross-sectional side view of a torque converter having a lock-up clutch and vibration damper assembly.

FIG. 2 is a cross-sectional view of the vibration damper assembly.

FIG. 3 is a partial cross-sectional front view of the vibration damper assembly.

FIG. 4 is a front view of a prior art pressure plate.

FIG. 5 is a front view of the pressure plate of the invention having elongated guide pin slots.

FIG. 6 is a partial side view of the vibration damper showing the relationship of the layers of friction material to the rotary input and driven members.

FIG. 7 is a hysteresis diagram of a damper with a pressure plate with a predetermined slot width.

FIG. 8 is a hysteresis diagram of a vibration damper having two pressure plates with different slot widths.

BEST MODE FOR CARRYING OUT THE INVENTION

FIG. 1 shows the vibration damper assembly in conjunction with a torque converter 10 of an automotive vehicle. The torque converter is bolted to the flywheel 12 of an engine, not shown, and is rotatable therewith. As is common in the automotive field, the flywheel 12 is attached to a rotary output shaft of the engine such as crankshaft 14.

The torque converter 10 has a casing 16 attached to the flywheel 12. The casing 16 has a plurality of threaded studs 18 which are received in mating apertures provided through the flywheel 12. The casing 16 is secured to the flywheel by nuts, such as nut 20, on each of the threaded studs 18. An impulse wheel 24 is attached to an annular flange 22 of the casing 16. The blades 26 of the impulse wheel 24 are carried directly by casing 16 and are rotatable therewith.

A turbine wheel 28 is connected to a hub 30. The hub 30 is coupled, by means of a spline 32, to an output shaft 34 which is rotatable with the turbine 28.

The lock-up clutch and damper assembly 36 is coupled to the hub 30. The lock-up clutch and damper assembly 36 has an annular friction member 38 bonded thereto which is engageable with the inner surface 40 of the casing 16. As is known in the art, the lock-up clutch and damper assembly 36 is hydraulically displaced into engagement with the casing 16 directly coupling the output shaft 34 to the engine's output shaft 14 through flywheel 12, casing 16, and the lock-up clutch and damper assembly 36.

The lock-up clutch and damper assembly 36 shown more clearly in FIGS. 2 and 3, has a rotary input member 42 which in the illustrated embodiment is the piston member of the lock-up clutch, a driven member 44 and an annular retainer plate 46. The annular retainer plate 46 is fixedly attached to the rotary input member 42 by means of rivets 48. The driven member 44 is disposed between the rotary input member 42 and the annular retainer plate 46 and is rotatable relative thereto. The driven member 44 has an internally splined flange 45 which engages mating splines provided on the hub 30 as shown in FIG. 1. The driven member 44 also has three trapezoidally shaped tongues 50. In a corresponding manner, the retainer plate 46 has three complementary shaped depressed regions which function as spring seats 52. In the disclosed embodiment three springs 54-58 are disposed between each tongue 50 and adjacent spring seats 52 disposed on opposite sides thereof. Balls 59 separate the center spring 56 from each adjacent spring. The springs 54 through 58 resiliently absorb the torsional vibrations of the engine's crankshaft due to the sequential firing of the individual cylinders of the engine.

The driven member 44, as shown in FIG. 3, has three arcuate slots 60 through which are received three drive pins 62 which in the illustrated embodiment are shouldered rivets. These shouldered rivets have one end attached to the rotary input member 42 and the opposite end attached to the retainer plate 46. The shouldered rivets 62 maintain the spacing between the rotary input member 42 and the retainer plate 46. The arcuate slots 60 limit the rotation of the driven member 44 relative to the rotary input member 42 and prevent the springs 54, 56 and 58 from being damaged.

In order to limit the amplitude of the angular displacement between the rotary input member 42 and the driven member 44 and to prevent unwanted resonant vibrations from being generated by the springs 54, 56 and 58, a pair of pressure plates 64 and 66 are disposed on opposite sides of the driven member 44. An annular bevel spring 68 is disposed between pressure plate 66 and the retainer plate 46 which produces a force sufficient to produce the desired friction between the driven member 44, the pressure plates 64 and 66, and the rotary input member 42.

The details of the pressure plates 64 and 66 are shown in FIGS. 5 and 6. Only pressure plate 64 will be discussed in detail since the structure of pressure plates 64 and 66 may be identical or may differ only in the angular extension of the arcuate pin slots. In prior art lock-up clutch and damper assemblies, the pressure plates 69 corresponding to pressure plates 64 and 66, had narrow pin slots 70 as shown in FIG. 4 which were dimensioned to have a width approximately equal to the diameter of the shouldered rivets 62 such that the pressure plate 68 rotated directly with the rotary input member 42 with no rotational lash between them. This condition reduced the amount of the crankshaft torsional vibrations absorbed by the springs 54 through 58 and permitted an objectional portion of the crankshaft torsional vibrations to be transmitted directly to the output shaft 34 of the torque converter through the frictional coupling between the rotary input member 42 and the driven member 44 which resulted from the rotation of the pressure plate 62.

As shown in FIG. 5, the circumferential width of the pin slots 72 of the pressure plates 64 and 66 is substantially greater than the diameter of the shoulder rivet 62 which permits the rotary input member 42 and the attached retainer plate 46 to be rotated through a predetermined angle before the shouldered rivets 62 are engaged by the ends of the pin slots 72.

In the partial cross-sectional view shown in FIG. 6, the pressure plates 64 and 66 have an annular metal plate 74. The metal plate 74 has a layer of high friction material 76 bonded on one side and a layer of low friction material 78 bonded on the opposite side. The pressure plates 64 and 66 are positioned so that the layers of high friction material 76 engage the opposite sides of the driven member 44. The coefficient of friction of the layer of low friction material 78 is selected to produce the desired friction between the rotary input member 42 and the driven member 44 when the drive pins 62 are intermediate the ends of the pin slots 72. Because the high friction material 76 is engaged with the driven member 44, the pressure plates 64 and 66 will preferably rotate with the driven member 44 when the rivets 62 are intermediate the ends of slots 72. As a result, the pressure plate 64 will provide a low frictional lag between the rotary input member 42 and the driven member 44 when the amplitude of the torsional vibrations of the rotary input member 42 relative to the driven member 44 is less than the angular displacement or travel of the drive pins 62 within the pin slots 72. However, when the amplitude of the torsional vibrations are greater than the angular displacement of the drive pins 62 between the ends of the slots 72, the drive pins 62 will engage the ends of the slots 72 terminating the rotation of the pressure plate 64 with the driven member 44. The termination of the rotation of the pressure plate 64 with the driven member 44 will cause the driven member 44 to rotate relative to the pressure plate. The layer of higher friction material 76 will now frictionally retard the continued rotation of the driven member 44 with a higher frictional force dissipating a significantly larger portion of the energy of the larger amplitude torsional vibrations.

The hysteresis diagram for a damper assembly having a single pressure plate 64 or 66 or when the widths of the slots 72 of pressure plates 64 and 66 are equal is shown in FIG. 7. Line 80 represents the amount of torque imparted to driven member 44 when the torsional vibrations of the rotary input member 42 is in a forward direction, such as the rotational direction of the crankshaft and when the drive pins 62 is within the slots 72. When the drive pins 62 engage the end of the slots, indicated by point 82, the torque imparted to the driven member 44 by the displacement of the higher friction material along the surface of the driven member 44 rapidly increases to a higher value as indicated by line 84. After the peak of the torsional vibration in the forward direction indicated by point 86 and the drive pins 62 start to traverse the slots 72 in the reverse direction, the torque imparted to the driven member 44 has a negative value as indicated by line 88. When the rivets or drive pins 62 engage the opposite end of the slots 72, as indicated by point 90, the torque transmitted from the rotary input member 42 to the driven member 44 decreases to a maximum negative value as indicated by line 92 until the torsional vibration of the rotary input member 42 relative to the driven member 44 reverses direction as indicated by point 94.

As is apparent from the hysteresis diagram shown on FIG. 7, at high engine speeds where the amplitude of the torsional vibrations of the rotary input member 42 relative to the driven member 44 are less than the unrestricted travel of the drive pins 62 within the slots 72 the friction between the rotary input member 42 and the driven member 44 has a low value. This low value is selected to be sufficient to prevent resonant vibrations from developing between the rotary input member 42 and driven member 44. This low friction allows the springs 54 through 58 to resiliently isolate the torsional vibrations of the engine's output shaft from the output of the torque converter and reduces the energy dissipated by the damper increasing the damper's efficiency.

At low engine speeds, the amplitude of the torsional vibrations of the rotary input member 42 relative to the driven member 44 are larger than the unrestricted angular displacement of the drive pins within slots 72. At the larger amplitudes of the torsional vibrations, the engagement of the drive pins 62 with the ends of the slots 72 terminate the rotation of the pressure plate 64 with the driven member 44 and the driven member 44 will now rotate relative to the pressure plate against the friction of the layer of higher friction material 76. This produces a larger frictional loss, called lag, which results in higher hysteresis as indicated by the hysteresis diagram of FIG. 7. This higher hysteresis, as is known in the art, assists the springs in dissipating the energy of the torsional vibrations having amplitudes greater than angular excursions of the drive pins 62 within the pin slots 72.

By making the width of the pin slots 72 in pressure plate 66 different from the widths of the slots 72 in pressure plate 64, the hysteresis diagram of the damper can be modified as shown in FIG. 8. In the hysteresis diagram, the line 96 corresponds to the condition where the drive pins 62 are intermediate the ends of the pin slots 72 of pressure plates 64 and 66. Upon engagement of the drive pins 62 with the end of the narrower pin slots 72, the friction increases resulting in an increase in the torque transmitted between the rotary input member 42 and the driven member 44 as indicated by line 98. Upon engagement of the drive pins 62 with the ends of the wider pin slots 72 on the other pressure plate, the torque between the rotary input member and the driven member again increases to its maximum value as indicated by line 100. Upon reversal of the direction of travel of the drive pins 62 in the pin slots 72, the torque will assume a negative value as indicated by line 102 and decrease in value in a step wise manner as the drive pins 62 engage the end of the narrower pin slot then the wider slot as indicated by lines 104 and 106 respectively. The arrangement makes the transition from a low friction state to a high friction state in two discrete steps rather than a single step which would occur if the width of the slots 72 on both pressure plates were equal.

As with the example shown in FIG. 7, at high engine speeds where the amplitude of the torsional vibrations of the rotary input member 42 relative to the driven member 44 are less than the unrestricted angular displacement of the drive pins 62 in the narrower pin slot 72, the friction between the rotary input member 42 and driven member 44 and the energy of the torsional vibrations will be absorbed primarily by the springs. For torsional vibrations having an intermediate amplitude, the rotation of only one of the pressure plates 64 or 66 relative to the driven member 44 will be terminated by the engagement of the drive pins with the end of the pin slots resulting in an intermediate friction between the rotary input member 42 and the driven member 44. For torsional vibrations having large amplitudes such as low engine speeds, the rotation of both pressure plates 64 and 66 with the driven member 44 will be sequentially terminated increasing the friction between the rotary input member 42 and the driven member 44 in two discrete steps from the low values indicated by lines 96 or 102 to a maximum value indicated by lines 100 or 106 respectively.

The circumferential or angular width of the slots in the pressure plates 64 and 66 are selected as a function of the engine, drive train and load. For example, the amplitude of the crankshaft torsional vibrations of a four cylinder engine will be larger than the amplitudes for a six or eight cylinder engine. Also, for heavier vehicles, the relative angular displacement of the rotary input member 42 to the driven member 44 will be greater than the relative angular displacement of the same two members for a lighter vehicle for engines whose output shafts have torsional vibrations of comparable magnitudes.

Having described the invention with regards to a specific configuration shown in the drawings and discussed in the specification, it is recognized that those skilled in the art may make changes or improvements thereto within the scope of the invention set forth in the appended claims.

We claim:

1. A pressure plate for a vibration damper assembly connectable between a rotary input and a rotary output, said vibration damper assembly including a rotary input member having an axis of rotation, at least one drive pin attached to the rotary input member offset from said axis of rotation and a driven member resiliently connected to said rotary input member and frictionally connected to said pressure plate, said at least one drive pin engageable with said pressure plate to rotate said pressure plate about said axis of rotation, said pressure plate comprising:

an annular plate having a first surface on one side thereof and a second surface on the opposite side thereof, said annular plate further having at least one arcuate slot receiving said at least one drive pin, said at least one arcuate slot having a circumferential width greater than the diameter of said at least one drive pin, permitting said rotary input member to rotate relative to said driven member through a predetermined angle;

a first layer of friction material bonded to said first surface; and a second layer of friction material bonded to said second surface.

2. The pressure plate of claim 1 wherein said first layer of friction material has a lower coefficient of friction than said second layer of friction material.

3. The pressure plate of claim 2 wherein said first layer of friction material is engageable with said rotary input member and said second layer of friction material is engageable with said driven member.

4. The pressure plate of claim 2 wherein said rotary input member has three drive pins equally spaced about said axis of rotation, and wherein said at least one circumferential slot comprises three equally spaced circumferential slots, each of said three equally spaced circumferential slots receiving a respective one of said drive pins.

5. A damper assembly for a torque converter having a rotary input and a rotary output;

a rotary input member coupled to said rotary input and rotatable therewith about an axis of rotation;

at least two symmetrically spaced drive pins attached to said rotary input member offset from said axis of rotation;

a first annular pressure plate disposed adjacent to said rotary input member, said annular pressure plate having at least two arcuate slots, each arcuate slot receiving a respective one of said at least two drive pins, said at least two arcuate slots having a circumferential length greater than the diameter of said drive pins permitting a first predetermined angular displacement of said pressure plate relative to said rotary input member about said axis of rotation, said annular pressure plate further having a first layer of friction material having a low coefficient of friction on a side facing said rotary input member and a second layer of friction material having a high coefficient of friction disposed on the opposite side;

a driven member attached to said rotary output, said driven plate disposed adjacent to said annular pressure plate on the side opposite said rotary input member;

means for resiliently connecting said driven member to said rotary input member; and means for resiliently biasing said driven member in a direction towards said rotary input member causing said rotary input member to frictionally engage said first layer of friction material on said annular pressure plate and said driven member to frictionally engage said second layer of friction material.

6. The damper assembly of claim 5 further comprising a retainer plate disposed on the side of said driven member opposite said rotary input member, said retainer plate attached to said rotary input member, and wherein said at least two pins are at least two shouldered rivets connected at one end to said rotary input member and at the opposite end to said retainer plate.

7. The damper assembly of claim 6 wherein said at least two drive pins comprise three equally spaced drive pins and said at least two arcuate slots comprise three arcuate slots equally spaced about said axis of rotation, each of said three arcuate slots receiving a respective one of said three drive pins.

8. The damper assembly of claim 7 further comprising a second pressure plate disposed between said driven member and said retainer plate, said second pressure plate having three arcuate slots equally spaced about said axis of rotation, each of said three arcuate slots receiving a respective one of said drive pins and having a circumferential length greater than the diameter of said drive pins permitting a second predetermined angular displacement between said second pressure and said rotary input member, said second pressure plate having a first layer of friction material having a low coefficient of friction on the side of said second pressure plate opposite to said driven member and a second layer of friction material having a high coefficient of friction on the side adjacent said driven member; and wherein said means for resiliently biasing said driven member is disposed between said retainer plate and said second pressure plate.

9. The damper assembly of claim 8 wherein the circumferential length of said slots of said first pressure plate and said second pressure plate are equal.

10. The damper assembly of claim 8 wherein said circumferential length of said slots of said first pressure plate and said second pressure plate are different.

11. A damper assembly for a torque converter having a rotary input and a rotary output comprising:

a rotary input member coupled to said rotary input, said rotary input member having an axis of rotation;

three drive pins attached to said rotary input member, said three drive pins symmetrically disposed about said axis of rotation;

a retainer plate spaced from said rotary input member, said retainer plate attached to said rotary input member about its periphery;

a driven member disposed intermediate said rotary input member and said retainer plate concentric with said axis of rotation, said driven member coupled to said rotary output;

a first pressure plate disposed between said rotary input member and said driven member, said first pressure plate having three arcuate slots, a first layer of friction material disposed on one side engageable with said rotary input member and a second layer of friction material disposed on an opposite side engageable with said driven member, each of said three arcuate slots receiving a respective one of said drive pins and having a width selected to permit a predetermined angular rotation of said first pressure plate relative to said rotary input member;

a second pressure plate disposed intermediate said driven member and said retainer plate, said second pressure plate having three arcuate slots, a first layer of friction material disposed on one side and a second layer of friction material disposed on the opposite side engageable with said driven member, each of said three arcuate slots receiving a respective one of said three drive pins and having a width selected to permit a second predetermined angular rotation of said second pressure plate relative to said rotary input member;

a resilient member disposed between said second pressure plate and said retainer plate resiliently biasing said second layer of said first and second pressure plates into frictional engagement with said driven member and said first layer of friction material into frictional engagement with said rotary input member; and a plurality of springs resiliently connecting said driven member to said rotary input member.

12. The damper assembly of claim 11 wherein said width of said arcuate slots of said first pressure plate is different from said width of said arcuate slots of said second pressure plate.

13. The damper assembly of claim 11 wherein said first layers of friction material have a low coefficient of friction and said second layers of friction material have a coefficient of friction substantially higher than said first layer of friction material.

14. A pressure plate for a vibration damper assembly comprising:

a flat annular plate having at least three arcuate slots symmetrically disposed about an outer periphery, said arcuate slots having a circumferential width greater than the radial width;

a first layer of friction material bonded on one side of said annular plate; and a second layer of friction material bonded on the side of said annular plate opposite said one side; wherein said first layer of friction material has a lower coefficient of friction than said second layer of friction material.

15. The pressure plate of claim 14 wherein said first and second layers of friction material have different coefficients of friction.

* * * * *